(12) United States Patent
Heinke et al.

(10) Patent No.: US 10,630,914 B2
(45) Date of Patent: Apr. 21, 2020

(54) THERMAL IMAGING CAMERA WITH GRAPHICAL TEMPERATURE PLOT

(71) Applicant: Fluke Corporation, Everett, WA (US)

(72) Inventors: Thomas Heinke, Santa Cruz, CA (US); James T. Pickett, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 283 days.

(21) Appl. No.: 15/208,986

(22) Filed: Jul. 13, 2016

(65) Prior Publication Data
US 2016/0323522 A1 Nov. 3, 2016

Related U.S. Application Data

(63) Continuation of application No. 13/556,620, filed on Jul. 24, 2012, now Pat. No. 9,413,988.

(51) Int. Cl.
| | |
|---|---|
| *H04N 5/33* | (2006.01) |
| *G01J 5/02* | (2006.01) |
| *G01J 5/08* | (2006.01) |
| *G01K 1/02* | (2006.01) |
| *G06T 11/20* | (2006.01) |
| *H04N 5/225* | (2006.01) |
| *H04N 5/232* | (2006.01) |
| *G01J 5/00* | (2006.01) |

(52) U.S. Cl.
CPC ............... *H04N 5/33* (2013.01); *G01J 5/025* (2013.01); *G01J 5/026* (2013.01); *G01J 5/0265* (2013.01); *G01J 5/084* (2013.01); *G01J 5/0806* (2013.01); *G01J 5/0846* (2013.01); *G01J 5/0859* (2013.01); *G01K 1/02* (2013.01); *G06T 11/206* (2013.01); *H04N 5/2258* (2013.01); *H04N 5/23216* (2013.01); *H04N 5/23293* (2013.01); *G01J 2005/0077* (2013.01)

(58) Field of Classification Search
CPC ........ G01J 5/00; G01J 2005/0077; G01J 5/08; G01N 21/35; G01N 2291/02881; G01N 25/4833; G01N 23/04
USPC ................................. 374/121, 130, 137, 170
See application file for complete search history.

(56) References Cited

U.S. PATENT DOCUMENTS

| | | | | |
|---|---|---|---|---|
| 3,798,366 A | * | 3/1974 | Hunt ................... | A61B 5/0059 250/334 |
| 5,099,120 A | * | 3/1992 | Turnbull ................ | H01L 37/02 250/332 |
| 5,133,605 A | * | 7/1992 | Nakamura ........... | G08B 17/125 250/330 |
| 5,159,198 A | * | 10/1992 | Kohsaka .............. | H04N 5/2251 250/330 |
| 5,775,806 A | | 7/1998 | Allred | |
| 5,910,816 A | * | 6/1999 | Fontenot .............. | A61B 5/0059 348/162 |
| 5,984,522 A | | 11/1999 | Koizumi | |

(Continued)

OTHER PUBLICATIONS

Extended European Search Report for EP13176311.2, dated Mar. 16, 2016, 10 pages.

*Primary Examiner* — Gail Kaplan Verbitsky
(74) *Attorney, Agent, or Firm* — Fredrikson & Byron, P.A.

(57) ABSTRACT

Methods and apparatus for monitoring a temperature of an object over time using a thermal imaging camera. The methods and apparatus may gather infrared temperature data from a selected source of temperature data within a scene at a selected time interval and display a graphical plot of the gathered temperature data on a digital display.

20 Claims, 7 Drawing Sheets

(56) References Cited

U.S. PATENT DOCUMENTS

| | | |
|---|---|---|
| 6,606,115 B1 | 8/2003 | Alicandro et al. |
| 6,751,342 B2 | 6/2004 | Shepard |
| 6,840,666 B2 | 1/2005 | Enachescu |
| 7,034,300 B2 | 4/2006 | Hamrelius et al. |
| 7,157,705 B2 * | 1/2007 | Hamrelius ............... G01J 5/025 250/330 |
| 7,411,193 B2 | 8/2008 | Warner et al. |
| 7,538,800 B1 * | 5/2009 | Caretti ............... G01M 11/0264 348/180 |
| 7,729,561 B1 * | 6/2010 | Boland ............... G06K 9/0063 382/109 |
| 7,822,268 B2 | 10/2010 | Rothenfusser et al. |
| 8,013,304 B2 * | 9/2011 | Haigh ............... G01J 5/02 250/330 |
| 8,047,707 B2 | 11/2011 | Pelletier |
| 8,055,054 B2 | 11/2011 | Ringermacher et al. |
| 8,136,984 B1 | 3/2012 | Heinke |
| 8,148,687 B1 | 4/2012 | Praly |
| 8,167,483 B2 * | 5/2012 | Jensen ............... G01J 5/0066 250/338.1 |
| 8,235,590 B2 * | 8/2012 | Sheard ............... G01J 5/026 250/338.1 |
| 8,354,639 B2 | 1/2013 | Jonsson et al. |
| 8,407,616 B2 * | 3/2013 | Bergstrom ............... G06T 11/206 250/330 |
| 8,483,990 B2 | 7/2013 | Warnke et al. |
| 8,692,887 B2 | 4/2014 | Ringermacher et al. |
| 2001/0044588 A1 | 11/2001 | Mault |
| 2002/0077766 A1 * | 6/2002 | Mault ............... G01K 1/024 702/131 |
| 2004/0124359 A1 | 7/2004 | Hamrelius et al. |
| 2005/0286608 A1 | 12/2005 | Ignatowioz |
| 2006/0078037 A1 | 4/2006 | Lee et al. |
| 2006/0157638 A1 * | 7/2006 | Takamizawa ...... G01N 21/6458 250/205 |
| 2006/0177104 A1 | 8/2006 | Prokoski |
| 2006/0197019 A1 | 9/2006 | Satou |
| 2006/0289768 A1 * | 12/2006 | Vallese ............... G01J 5/02 250/353 |
| 2007/0075246 A1 | 4/2007 | Gatt |
| 2007/0288177 A1 | 12/2007 | Rothenfusser et al. |
| 2008/0067455 A1 * | 3/2008 | Zombo ............... G01N 25/72 250/504 R |
| 2008/0129707 A1 * | 6/2008 | Pryor ............... G06F 3/0425 345/175 |
| 2008/0308732 A1 | 12/2008 | Warnke et al. |
| 2009/0024023 A1 | 1/2009 | Welches et al. |
| 2009/0065695 A1 | 3/2009 | DeMarco et al. |
| 2009/0245633 A1 * | 10/2009 | Bilcu ............... G06T 5/004 382/167 |
| 2010/0012840 A1 | 1/2010 | King |
| 2010/0014746 A1 | 1/2010 | Warnke et al. |
| 2010/0058222 A1 | 3/2010 | Bergstrom et al. |
| 2010/0148066 A1 | 6/2010 | Stratmann et al. |
| 2011/0001809 A1 | 1/2011 | McManus et al. |
| 2011/0231909 A1 * | 9/2011 | Shibuya ............... G06F 21/31 726/5 |
| 2011/0319795 A1 | 12/2011 | Lechtzier et al. |
| 2013/0042303 A1 * | 2/2013 | Chow ............... G06F 21/36 726/3 |
| 2013/0114641 A1 * | 5/2013 | Sutton ............... G01N 33/0098 374/121 |
| 2013/0116573 A1 | 5/2013 | Herman |
| 2013/0161526 A1 * | 6/2013 | Tajima ............... A61B 6/5258 250/394 |
| 2013/0181134 A1 * | 7/2013 | Forster ............... F01N 3/0222 250/341.6 |
| 2014/0243683 A1 | 8/2014 | Xiao et al. |
| 2016/0011115 A1 * | 1/2016 | Chen ............... G01N 21/274 250/459.1 |
| 2016/0054555 A1 * | 2/2016 | Fletcher ............... G02B 21/0008 348/79 |
| 2016/0247033 A1 * | 8/2016 | Kotovich ............... G06K 9/036 |

* cited by examiner

THERMAL IMAGING CAMERA WITH GRAPHICAL TEMPERATURE PLOT

CROSS-REFERENCES

This application is a continuation of U.S. application Ser. No. 13/556,620, filed Jul. 24, 2012, the contents each of which is hereby incorporated by reference in its entirety.

BACKGROUND

Thermal imaging cameras are used in a variety of situations. For example, thermal imaging cameras are often used during maintenance inspections to thermally inspect equipment. Such equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Depending on the configuration of the camera, the thermal imaging camera may also generate a visible light image of the same object. The camera may display the infrared image and the visible light image in a coordinated manner, for example, to help an operator interpret the thermal image generated by the thermal imaging camera. Unlike visible light images which generally provide good contrast between different objects, it is often difficult to recognize and distinguish different features in a thermal image as compared to the real-world scene. For this reason, an operator may rely on a visible light image to help interpret and focus the thermal image.

In applications where a thermal imaging camera is configured to generate both a thermal image and a visual light image, the camera may include two separate sets of optics: visible light optics that focus visible light on a visible light sensor for generating the visible light image, and infrared optics that focus infrared radiation on an infrared sensor for generating the infrared optics. Appropriately configuring each of these sets of optics may dictate the ease with which an operator can use the thermal imaging camera and the quality of the visible light and infrared images generated by the thermal imaging camera.

In some situations, it can be difficult to detect a change in temperature using a thermal imaging camera by visual observation of the live image or saved infrared images. For example, if an object normally operates at an elevated temperature, an increase in temperature of the already hot object may be hard to detect. Alternatively, if the change in temperature occurs slowly over a period of time, or if the temperature change only occurs intermittently, it may also be difficult to notice a change in a thermal image only by visual observation of the image. In such situations, it would be useful to have a better way to monitor and detect temperature changes over time using a thermal imaging camera. In addition, some parameters that are available only in numeric form on the live image, like minimum or maximum temperatures, or center box average temperatures are not easily monitored for changes over time by the human eye.

SUMMARY

In general, this disclosure is directed to a thermal imaging camera that gathers and displays temperature data as graphical plots.

Certain embodiments of the invention provide a method of monitoring a temperature of an object over time using a thermal imaging camera. The method includes positioning the thermal imaging camera with the thermal imaging camera focused on a scene, where the thermal imaging camera includes a digital display and a memory. The method also includes displaying an infrared image of the scene on the digital display, selecting a source of temperature data from the infrared image on the digital display, and selecting a time interval for gathering temperature data from the selected source of temperature data. The method may also include gathering temperature data from the selected source of temperature data at the selected time interval, displaying a graphical plot of the gathered temperature data on the digital display, and storing the graphical plot or the gathered temperature data in the memory of the thermal imaging camera.

In addition, certain embodiments of the invention provide a method of monitoring a temperature of an object over time using a thermal imaging camera. The method includes positioning the thermal imaging camera with the thermal imaging camera focused on a scene, where the thermal imaging camera includes a digital display and a memory. The method may also include displaying an infrared image of the scene on the digital display, selecting a source of temperature data from the infrared image comprising selecting all of the infrared image, selecting a portion of the infrared image which is less than all of the infrared image, or selecting a discrete point on the infrared image. The method may also include selecting a time interval for gathering temperature data from the selected source of temperature data, gathering temperature data from the selected source of temperature data at the selected time interval, and displaying a graphical plot of the gathered temperature data on the digital display, where the gathered temperature data is displayed as data points at the selected time intervals and the data points are connected to create a line representing temperature over time. The method may also include storing the graphical plot or the gathered temperature data in the memory of the thermal imaging camera.

In addition, certain embodiments of the invention may provide a thermal imaging camera that includes an infrared camera module, a visible light camera module, a digital display, a processor and a memory. In such embodiments, the digital display may be configured to display an infrared image of a scene and to allow a user to select a source of temperature data from the infrared image. The processor may be configured to gather temperature data from the selected source of temperature data at intervals selected by the user and to generate a graphical plot of the gathered temperature data over time, and the digital display is further configured to display the graphical plot. The memory may be configured to store the graphical plot or the gathered temperature data.

The details of one or more examples are set forth in the accompanying drawings and the description below. Other features, objects, and advantages will be apparent from the description and drawings, and from the claims.

DETAILED DESCRIPTION

The following detailed description is exemplary in nature and is not intended to limit the scope, applicability, or configuration of the inventions in any way. Rather, the following description provides some practical illustrations for implementing various embodiments. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

In order to assist a user in observing temperature changes in the scene, the thermal imaging camera may provide a graphical temperature plot presenting temperature data over time for a scene being monitored by the camera, and this temperature plot may be shown on the display of the camera. Such graphical temperature plot may include the temperature for a specific point in the IR image, such as the center point of the image or a different individual point selected by the user, or may include information from a particular area or portion of the image such as the average, minimum and/or maximum temperature in that area. The temperature data used for the graphical temperature plot may be gathered continuously or at fully adjustable intervals and durations, so that changes in the temperature may be more readily apparent to the operator and/or so the timing of such changes may be identified. In addition, the graph data can be saved continuously so that if an image is captured at any time during the interval, the graph for the full interval can be associated with/appended to the IR image file(s).

Figure 1:
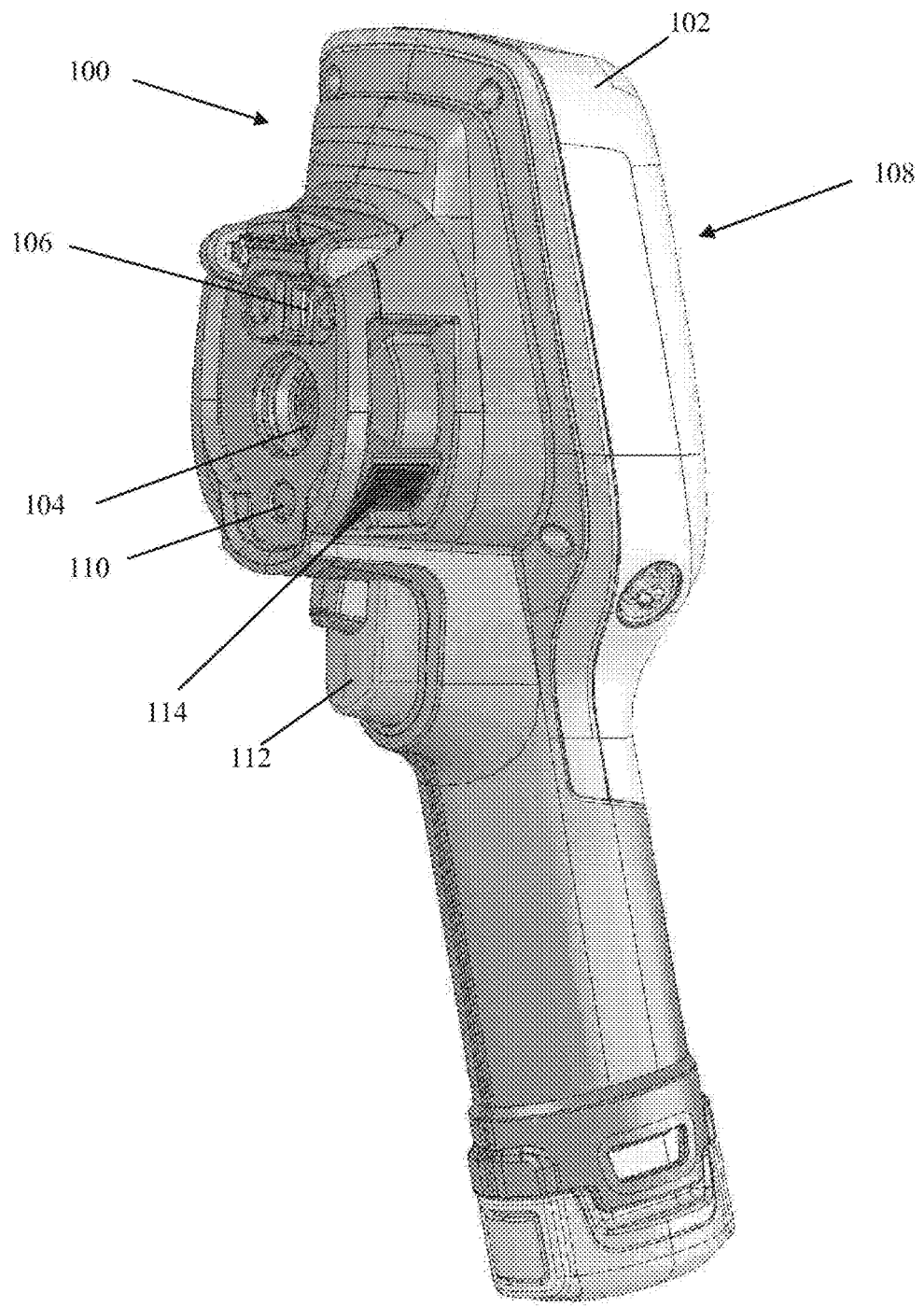
FIG. 1 is a perspective front view of a thermal imaging camera according to some embodiments.
Figure 2:
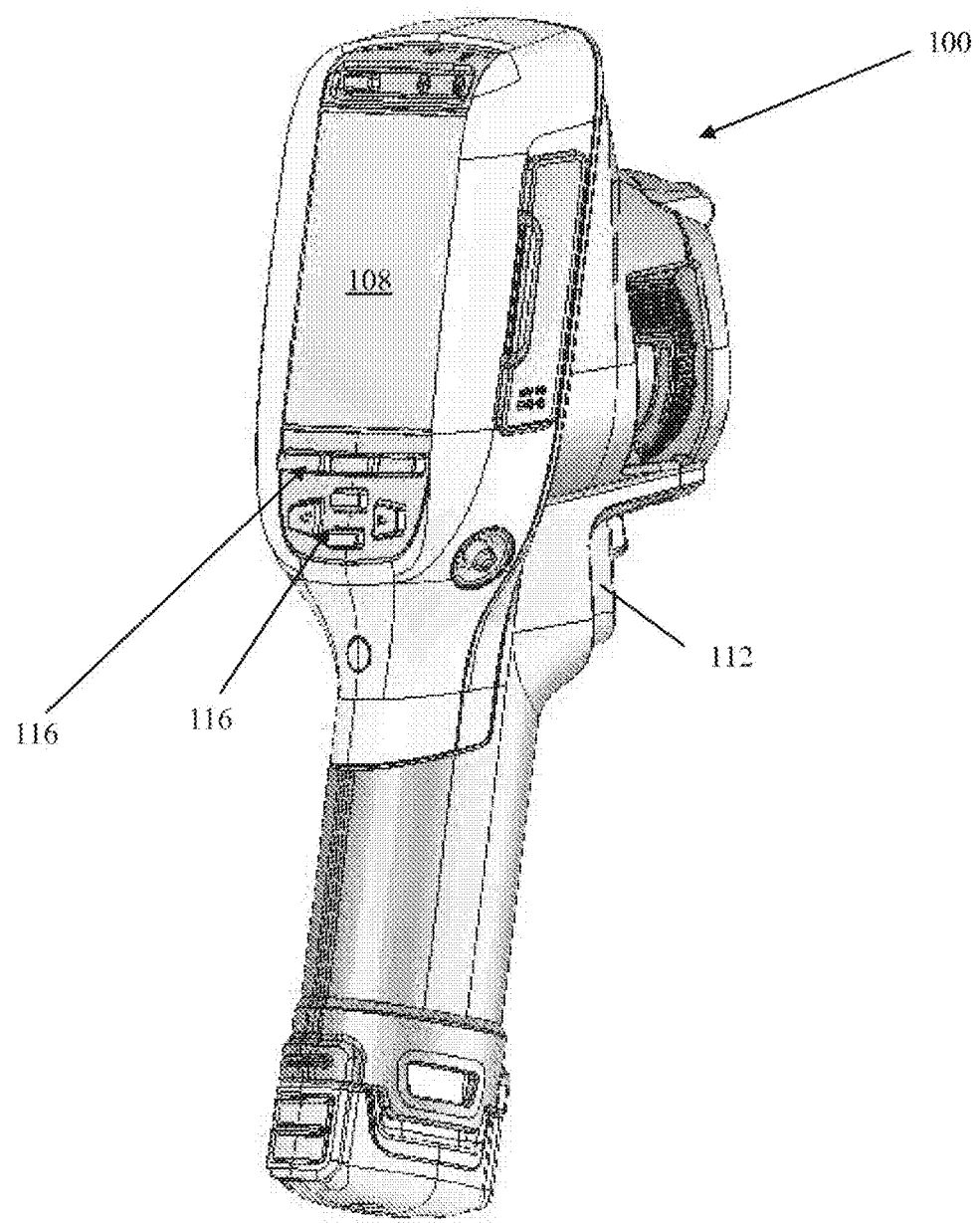
FIG. 2 is a perspective back view of the thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene.

Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image and to generate the graphical temperature plot. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data and the graphical temperature plot. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image and to generate the data for the graphical temperature plot. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

Data of the distance-to-target, as measured by the laser 110, can be stored and associated with the corresponding captured image. For images which are captured using automatic focus, this data will be gathered as part of the focusing process. In some embodiments, the thermal imaging camera will also detect and save the distance-to-target data when an image is captured. This data may be obtained by the thermal imaging camera when the image is captured by using the laser 110 or, alternatively, by detecting the lens position and correlating the lens position to a known distance-to-target associated with that lens position. The distance-to-target data may be used by the thermal imaging camera 100 to direct the user to position the camera at the same distance from the target, such as by directing a user to move closer or further from the target based on laser measurements taken as the user repositions the camera, until the same distance-to-target is achieved as in an earlier image. The thermal imaging camera may further automatically set the lenses to the same positions as used in the earlier image, or may direct the user to reposition the lenses until the original lens settings are obtained.

During operation of thermal imaging camera 100, an operator may wish to view a thermal image of a scene and/or a visible light image of the same scene and/or a graphical plot of the infrared data generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, a combined image that is a simultaneous display of the visible light image and the infrared image and/or a graphical plot of the infrared data generated by the camera. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
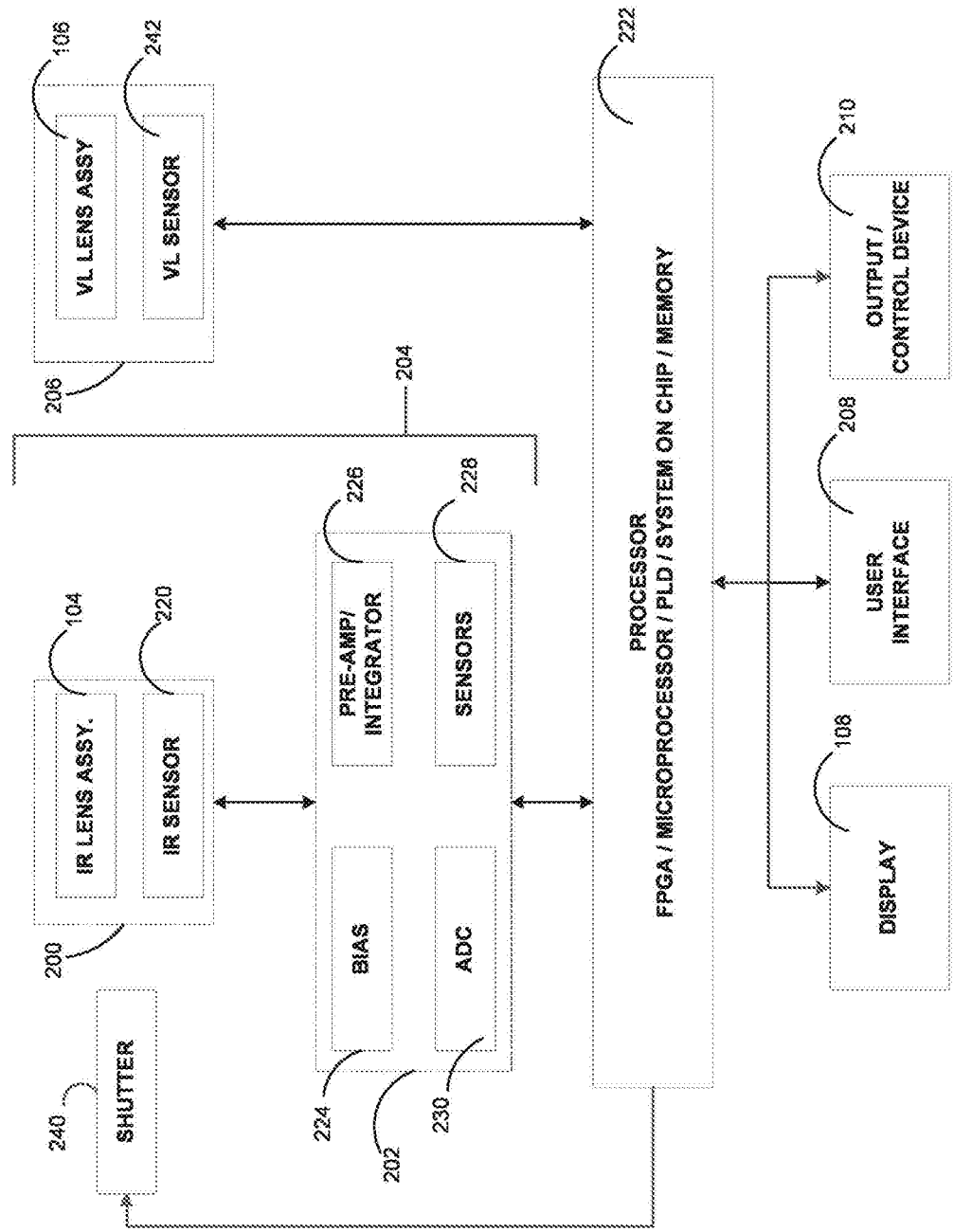
FIG. 3 is a functional block diagram illustrating components of thermal imaging cameras according to some embodiments.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210. A power supply (not shown) delivers operating power to the various components of thermal imaging camera 100 and, in some examples, may include a rechargeable or non-rechargeable battery and a power generation circuit.

D FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared lens assembly 104 can have a variety of different configurations. In some examples, infrared lens assembly 104 defines an F-number (which may also be referred to as a focal ratio or F-stop) of a specific magnitude. An F-number may be determined by dividing the focal length of a lens (e.g., an outermost lens of infrared lens assembly 104) by a diameter of an entrance to the lens, which may be indicative of the amount of infrared radiation entering the lens. In general, increasing the F-number of infrared lens assembly 104 may increase the depth-of-field, or distance between nearest and farthest objects in a target scene that are in acceptable focus, of the lens assembly. An increased depth of field may help achieve acceptable focus when viewing different objects in a target scene with the infrared optics of thermal imaging camera 100 set at a hyperfocal position. If the F-number of infrared lens assembly 104 is increased too much, however, the spatial resolution (e.g., clarity) may decrease such that a target scene is not in acceptable focus.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 640×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter xx can be externally or internally located relative to the lens xx and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data, graphical temperature plots, and or the data used in generating the data points for the graphical temperature plot to be easily transferred to another computing device, or to be removed before thermal imaging camera 100 is used in another application. Processor 222 may also be implemented as a System on Chip that integrates all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at a given point in time.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. Processor 222 may perform computations to convert raw infrared image data into scene temperatures (radiometry) including, in some examples, colors corresponding to the scene temperatures. Temperatures from the selected data source may be used by the processor 222 to identify temperatures at a specific point (such as a specific pixel and corresponding sensor), average, minimum and/or maximum temperatures and to create the graphical temperature plot. Processor can also generate temperature data (with temperature values in standard units such as Celsius or Fahrenheit) and data points using the magnitude of the electrical signal from each sensor to use to create a graphical temperature plot.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108.

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

As noted above, processor 222 may be configured to determine a distance between thermal imaging camera 100 and an object in a target scene captured by a visible light image and/or infrared image generated by the camera. Processor 222 may determine the distance based on a focus position of the infrared optics associated with the camera. For example, processor 222 may detect a position (e.g., a physical position) of a focus mechanism associated with the infrared optics of the camera (e.g., a focus position associated with the infrared optics) and determine a distance-to-target value associated with the position. Processor 222 may then reference data stored in memory that associates different positions with different distance-to-target values to determine a specific distance between thermal imaging camera 100 and the object in the target scene.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In a combined arrangement, the visible light image and the infrared image may be superimposed on top of one another. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an example combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like.

Additionally, in some embodiments, the processor 222 can interpret and execute commands from user interface 208, an output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale or amber. In other examples, display 108 is configured to display an infrared image in a color palette such as, e.g., ironbow, blue-red, or other high contrast color scheme. Combinations of grayscale and color palette displays are also contemplated.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment. FIGS. 4A-4D are conceptual illustrations of one example of a picture-in-picture type display of a visual image and an infrared image. In the examples of FIGS. 4A-4D, visual image surrounds infrared image, although in other examples infrared image may surround visual image, or visual image and infrared image may have different relative sizes or shapes than illustrated and it should be appreciated that the disclosure is not limited in this respect.

Figure 4A:
FIGS. 4A-4D are sample images shown on the display of the thermal imaging camera that show a picture-in-picture type concurrent display of a visual image and an infrared image and that show selected sources of infrared data according to some embodiments.
Figure 4B:
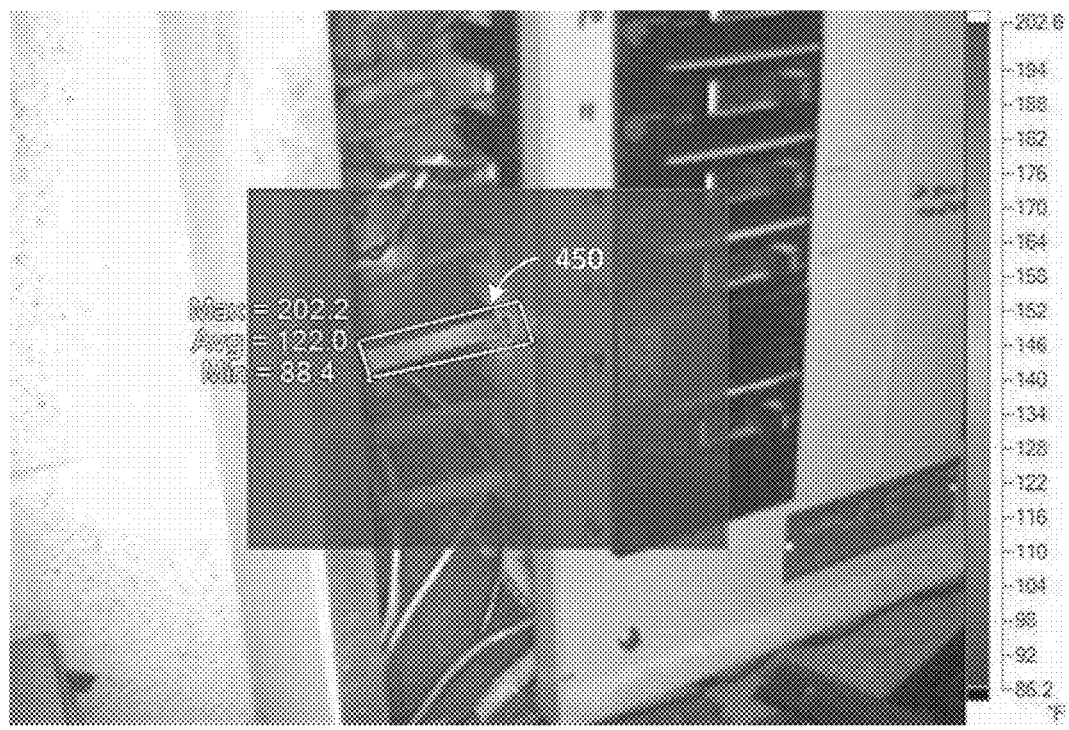
Figure 4C:
Figure 4D:

Embodiments of the invention may allow an operator to select a source of temperature data for use in the graphical plot of temperature using one or more user input media. For example, as shown in FIGS. 4A-4D, the operator may select a portion of the image on the display 108, using a shape 450 such as a box, circle, or oval to define an area of interest. For example, the display may present one or more shape 450 options for selection by the operator and for positioning on the infrared image. The shape 450 may be moveable on the display 108 and may be adjustable in size to encompass more or less of the scene. The shape 450 may overlay on the infrared image and may be transparent, or may outline a portion of the scene as the area of interest. The area of interest defined by the shape 450 may be the area from which temperature data is obtained for use in the graphical temperature plot. For example, as shown in FIGS. 4A and 4B, the operator has selected rectangular portion of the infrared image, as indicated by the shape 450 (rectangle) graphically overlaid on top the infrared image, as the source of temperature data. The display graphically displays the maximum, average, and minimum measured temperatures within the selected, rectangular area. As discussed further below, these same values may be used to create individual graphical plots of the maximum, average, and/or minimum measured temperatures over time. Alternatively, the operator may select one or more specific discrete points on the display 108 using a cursor or other moveable icon or by touching the display 108 at the desired point. For instance, in FIG. 4C, the measured temperature associated with the hottest spot in the infrared image is displayed and the measured temperature associated with the center spot in the infrared image are displayed. In FIG. 4D, the measured temperature associated with the hottest spot and the coldest in the infrared image are both displayed. In other alternatives, the thermal imaging camera 100 may use all of the infrared image in the display 108 as a source of temperature data for the graphical temperature plot. The operator may make these selections using user input control functions such as display navigation buttons or by directly touching the screen in embodiments including a touch screen display, for example. x The temperature data gathered from the selected data source may include the temperature (such as for a specific selected point), or the maximum, minimum and/or average temperature within the selected data source area of the infrared image. In some embodiments, the operator may select which one or more types of temperature data will be gathered from the data source. The operator may further select the frequency with which such data is obtained for inclusion in the graphical plot and the duration of time in units of time or in numbers of data points that will be gathered. For example, the operator may select to have the temperature data gathered and included in the graphical plot once per minute, once per hour, or once per day, or any other desired time interval. These selections may be made using any of the user input media described above, for example.

In some embodiments, the operator may further select whether or not infrared images will be captured and stored in association with the graphical temperature plot, and which images they will be. For example, an infrared image associated with a graphical temperature plot may be stored for each data point, for only the first data point, for only the first and the last data points, or at a certain frequency. In other embodiments, the thermal imaging camera 100 will automatically capture and store certain images in association with the graphical temperature plot in a predetermined manner. In some embodiments, the stored infrared images are the entire infrared image, while in other embodiments, the stored infrared image is a portion of the infrared image which is less than the entire image. In addition, the stored images may be stored in a video data format, such as .MPG, .AVI, or .IS3, a fully radiometric format. The plots could be placed alongside the stored images in the video data format. The infrared images could be added to the video data stream at a standard frame rate or the frame rate of the storage could be adjusted to capture frames as the same rate as each data point is added to the graphical temperature plot.

Figure 5:
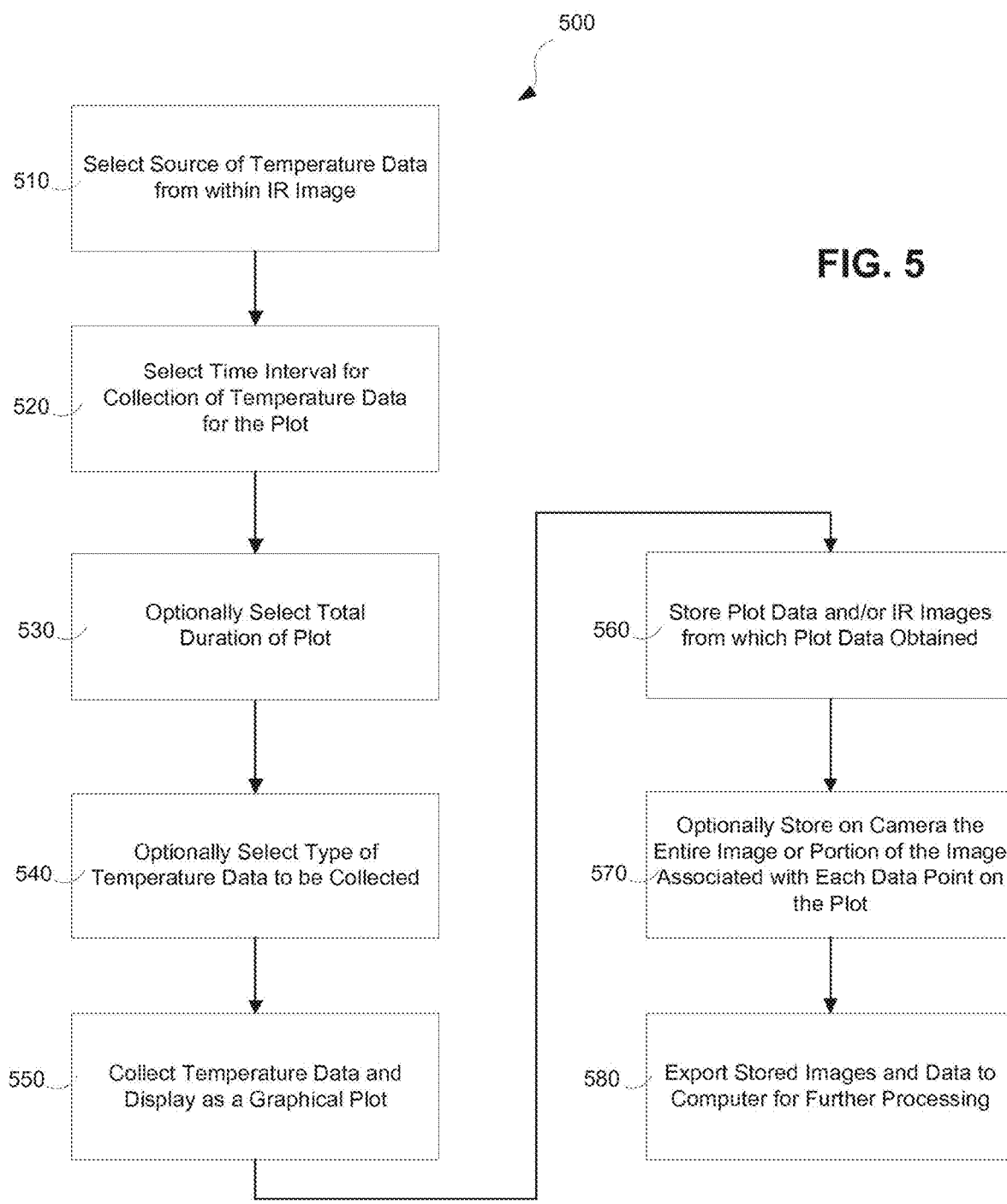
FIG. 5 is a flow chart of a method of using a thermal imaging camera according to some embodiments.

FIG. 5 is a flow chart of a method of creating a graphical temperature plot using the thermal imaging camera 100. The thermal imaging camera 100 may first be positioned to capture a scene of interest. It may remain fixed in this position throughout the time during which it is gathering temperature data for the graphical temperature plot. In step 510, an operator selects a source of temperature data from an image on the display 108. The image may be a visible light image, an infrared image, or a combination image. The operator may select the source of temperature data as the entire image, a portion of the image that is less than the entire image, or one or more specific points on the image. For example, the portion of the image may be a shape within the image, such as a square, circle, or oval shape, that may be moved and size adjusted by the user until it delineates (e.g., encloses, highlights, or shades) the portion of the image from which the operator desires a graphical plot of temperature data.

In step 520, the operator selects the time interval for the collection of data for inclusion in the graphical temperature plot. The frequency selected by the user may depend upon the scene being monitored and the speed with which temperature changes would be expected to occur. If temperature changes occur more rapidly, a shorter duration between data points would be desired than if temperature changes occur more slowly. In some embodiments, the user may also select continuous data collection.

In step 530, the operator may optionally select the total duration of the plot, which may either be in terms of total time or total number of data points. Alternatively, the thermal imaging camera 100 may continuously add additional data points to the plot with no defined end. The thermal imaging camera 100 may continue to add data points to the graphical temperature plot until either directed to stop by the operator, until the thermal imaging camera 100 is powered off, or until the thermal imaging camera memory 110 is full, for example.

In step 540, the operator may optionally select the type of temperature data to be collected for generating data points for the plot. For example, if the operator selects a portion of an image, such as an infrared image, as the temperature data source, the operator may then select one or more or all three of the average temperature, the minimum temperature, and the maximum temperature within the data source. If the operator selected one or more specific points, the actual detected temperature at that point may be displayed without the need for operator input to indicate the type of temperature data to be displayed. In some embodiments, when the operator selects a portion of the image as the data source, the thermal imaging camera 100 may automatically include all three of the minimum, maximum, and average temperatures in the graphical temperature plot for that portion without any operator selection required. It should be noted that the above steps 510 through 540 may be performed in any order.

In step 550, the thermal imaging camera 100 collects the temperature data as directed in steps 510-540 and displays the data on a graphical temperature plot. The graphical temperature plot may be presented on the display 108 along with the current infrared and/or visible light image or with a different selected infrared and/or visible light image, or may be presented alone on the display 108 without any infrared or visible light images.

In step 560, the thermal imaging camera 100 stores the temperature data, data points and/or infrared images from which the temperature data and/or data points were obtained. This stored data and/or images may then be updated periodically with each successive data collection at the selected intervals until expiry of the data gathering time period, or may continue indefinitely.

In step 570, the thermal imaging camera 100 may optionally store infrared images, or a portion of an infrared image obtained at the same time as, or at approximately the same time as, one or more data points of the graphical temperature plot. For example, the thermal imaging camera 100 may store an infrared image or portion thereof (such as the data source portion) associated with the first and/or the last data point, all data points, or any other number or frequency of images. The user may have the option to select which images, if any, will be stored by the thermal imaging camera 100 in association with the graphical temperature plot.

In step 580, the camera may export the stored temperature plot and/or temperature data and optionally any associated images to a processor, such as the processor of a computer, for further processing of the data, or alternatively to an external memory storage device.

Figure 6:
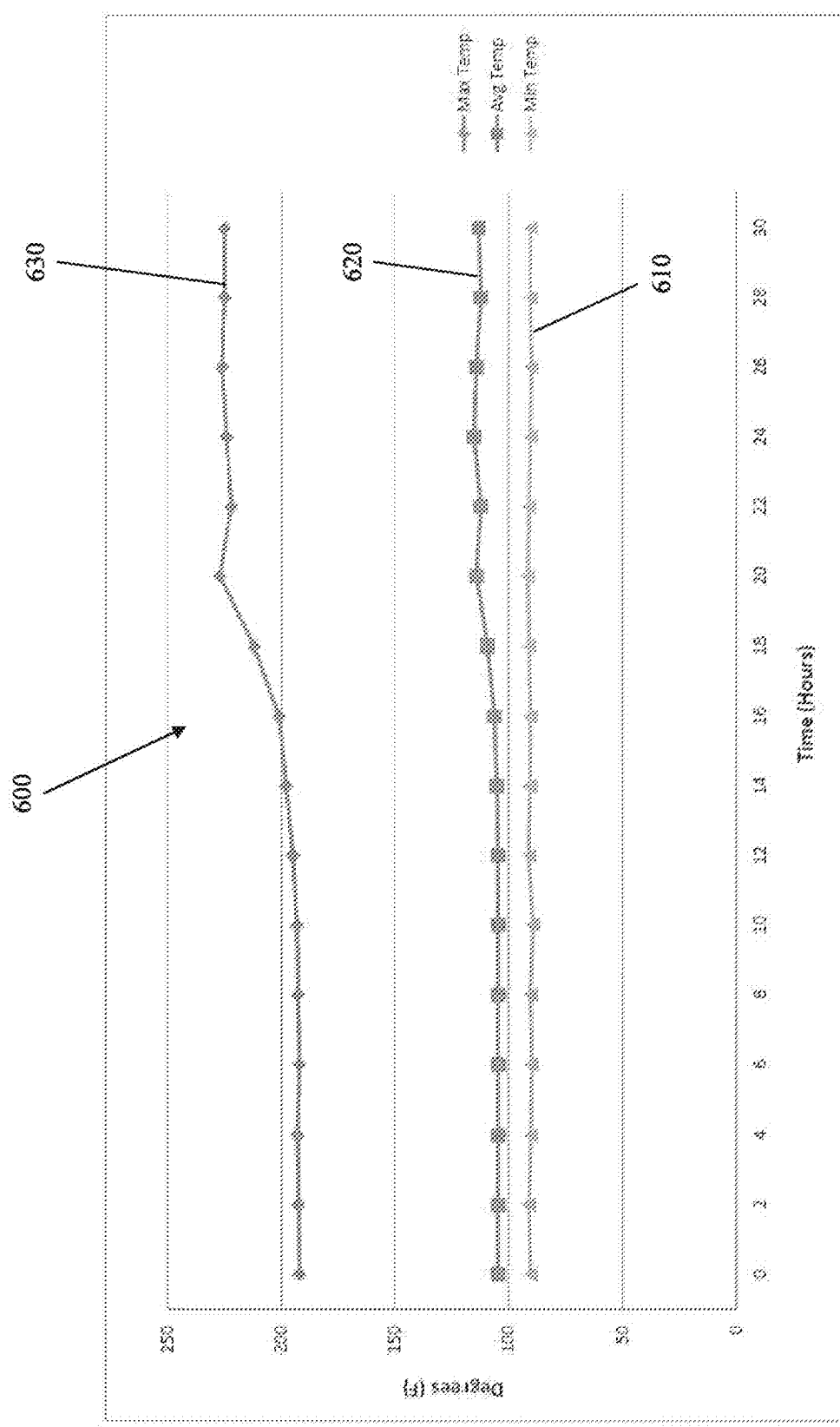
FIG. 6 is an example of a graphical temperature plot according to some embodiments.

An example of a theoretical graphical temperature plot 600 that may be generated, displayed and stored by a thermal image camera 100 according to various embodiments is shown in FIG. 6. In this example, the data points that were used to generate the plot are connected by lines, with the resulting lines representing the minimum 610, average 620 and maximum temperature 630 over time of a data source such as portion of an infrared image, as if these values were obtained and plotted by the thermal imaging camera 100 with a frequency of every two hours. Temperature is shown on the y axis while time, in duration from the start of the data gathering at time zero, is shown on the x axis. Alternatively, the time scale on the x axis could be the actual time (as in Greenwich mean time or the current local time) or could be consecutively numbered data points or other similar numbering system directly correlating to time. In this example, it can be seen that the minimum temperature 610 remained generally constant. The maximum temperature 630 was approximately constant for about the first 10 hours and then began to gradually increase to a peak temperature at 20 hours, and then reduced slightly to a new approximately constant temperature which was greater than the original maximum temperature. The average temperature 620 increased in a pattern that more or less reflects the increase in the maximum temperature. The temperature increase shown for the maximum temperature line 630, being the hottest portion of the selected portion of the image, and increasing somewhat modestly from about 190 to about 225° F., might be difficult to observe visually on an infrared image, but the graphical temperature plot 600 shows the temperature change clearly. Such a temperature change might represent a change in the functioning of the object corresponding to the hottest portion of the image. The graphical temperature plot 600 not only makes it easier to be aware of such changes in temperature, but also allows the timing of such changes to be identified. A graphical data plot 600 such as this one may be presented on the display 108 alone or along with the current or captured infrared and/or visible light images, such as by occupying only a portion of the display 108 or by overlapping the infrared and/or visible image, for example.

Examples of thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor or other processor of the camera, to perform the method, e.g., when the instructions are executed. Computer readable storage media may include random access memory (RAM), read only memory (ROM), a hard disk, optical media, or other computer readable media.

Various examples have been described. These and other examples are within the scope of the following claims.

The invention claimed is:

1. A thermal imaging system comprising:
an infrared camera module;
a memory;
a processor configured to:
   gather temperature data from a source of temperature data via the infrared camera module at a plurality of times corresponding to a specified time interval,
   receive a selection indicating at which of the plurality of times to capture and save an associated infrared image,
   save in memory one or more infrared images representing the source of temperature data at one or more, but fewer than all, of the plurality of times at which temperature data is gathered according to the received selection;
   generate a graphical plot of the gathered temperature data over time, the graphical plot including a plurality of data points such that, for each of the plurality of times at which temperature data is gathered, the generated graphical plot includes an associated data point, and
   save the generated graphical plot of the gathered temperature data in memory associated with the one or more saved infrared images such that the number of data points in the saved graphical plot is greater than the number of the one or more associated infrared images saved in memory; and
a digital display configured to display an infrared image of a scene and the generated graphical plot.

2. The thermal imaging system of claim 1, wherein the processor is configured to cause the display to simultaneously display the saved graphical plot and at least one of the one or more saved infrared images of the scene captured at one of the times at which the temperature data is gathered.

3. The thermal imaging system of claim 1, wherein the gathered temperature data includes a minimum temperature, a maximum temperature, and an average temperature, and wherein the one or more user input media allows a user to select a combination of the minimum temperature, the maximum temperature, and the average temperature for display in the graphical plot.

4. The thermal imaging system of claim 1, further comprising one or more input media in communication with the processor to allow a user to adjust one or more parameters of the thermal imaging system.

5. The thermal imaging system of claim 4, wherein the source of temperature data comprises at least a portion of an infrared image, and wherein the one or more input media can be used to select the source of temperature data from the infrared image.

6. The thermal imaging system of claim 5, wherein selecting the source of temperature data from the infrared image comprises defining, via the input media, one or more portions of the infrared image which is less than the entire infrared image, and wherein defining the one or more portions of the infrared image comprises positioning one or more shapes overlaying or surrounding the one or more portions, and wherein the saved one or more infrared images comprises the one or more portions of the infrared image, which is less than the entire infrared image.

7. The thermal imaging system of claim 6, wherein the one or more shapes comprise a box, a circle, and/or an oval.

8. The thermal imaging system of claim 4, wherein the one or more input media allows a user to select a time interval for gathering temperature data from the selected source of temperature data.

9. The thermal imaging system of claim 4, wherein the user input media allows a user to select the number of infrared images of the scene to capture and save in memory.

10. The thermal imaging system of claim 1, wherein the infrared camera module, the memory, the processor, and the digital display are supported by a housing of a thermal imaging camera.

11. The thermal imaging system of claim 1, further comprising a visible light camera module configured to capture visible light image data, and wherein the displayed infrared image comprises visible light image data.

12. A thermal imaging system comprising:
an infrared camera module;
a memory;
a user interface;
a digital display; and
a processor in communication with the infrared camera module, the memory, the user interface, and the digital display, the processor being configured to:
   display an image of a scene on the digital display;
   receive an input from the user interface defining a selected portion of the scene,
   gather temperature data from the selected portion of the scene via the infrared camera module at a plurality of times corresponding to a specified time interval,
   receive a selection from the user interface indicating at which of the plurality of times infrared images are to be captured,
   capture and save in memory an infrared image of the scene at one or more, but fewer than all, of the times at which the temperature data is gathered according to the received selection,
   generate a graphical plot of the gathered temperature data over time, and
   save the graphical plot of the gathered temperature data in memory associated with the one or more captured infrared images such that the number of the one or more saved infrared images is less than the number of data points in the saved graphical plot.

13. The thermal imaging system of claim 12, further comprising a visible light camera module.

14. The thermal imaging system of claim 13, wherein the displayed image of the scene from which the selected portion is selected comprises visible light image data captured via the visible light camera module.

15. The thermal imaging system of claim 14, wherein the displayed image of the scene comprises a blend of visible light and infrared image data.

16. The thermal imaging system of claim 12, wherein the processor is further configured to display the saved graphical plot of the gathered temperature data simultaneously with at least one of the one or more captured infrared images on the digital display.

17. The thermal imaging system of claim 12, wherein the graphical temperature plot comprises minimum temperature, maximum temperature, and/or average temperature of the selected portion of the scene.

18. The thermal imaging system of claim 12, wherein the selected portion is less than the entire scene.

19. A thermal imaging system comprising:
- an infrared camera module configured to capture infrared images including temperature data;
- a memory;
- a user interface;
- a digital display; and
- a processor in communication with the infrared camera module, the memory, the user interface, and the digital display, the processor being configured to:
- display an infrared image of a scene on the digital display, the infrared image including temperature data;
- receive an input from the user interface defining a selected portion of the scene that is less than the entire scene,
- gather temperature data from the selected portion of the scene via the infrared camera module at a plurality of times corresponding to a specified time interval,
- generate a graphical plot of the gathered temperature data over time,
- save the graphical plot of the gathered temperature data in memory and infrared image data corresponding to the selected portion of the scene, such that the saved infrared image data is representative of less than the entire scene and corresponds to the selected portion of the scene that is represented by the saved graphical plot of the gathered temperature data.

20. The thermal imaging system of claim 19, wherein an infrared camera module, the memory, the user interface, the digital display, and the processor are enclosed in a housing of a thermal imaging camera.

* * * * *